C. E. QUIMBY.
LENS.
APPLICATION FILED OCT. 22, 1914.
1,303,495.
Patented May 13, 1919.
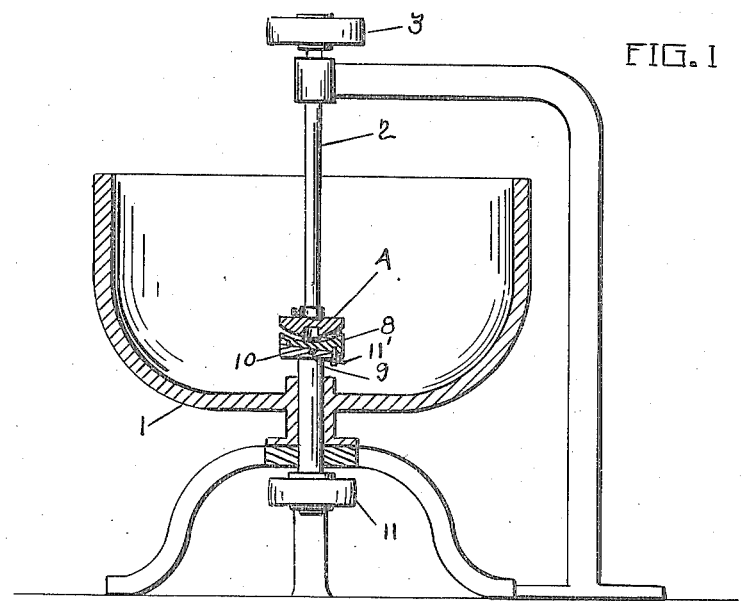
FIG. 1
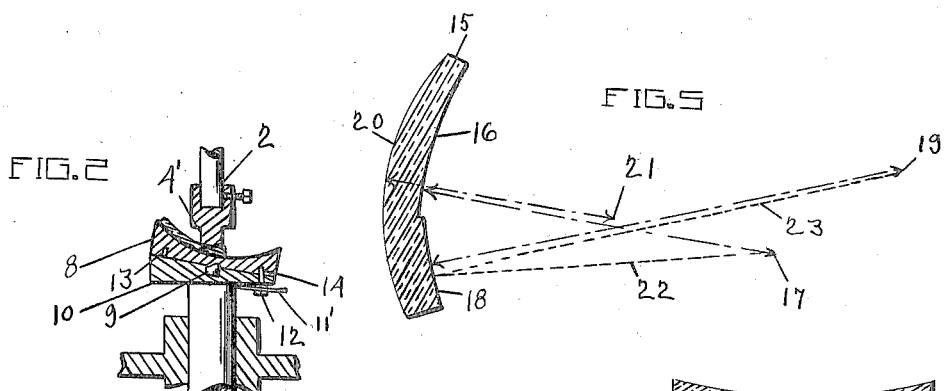
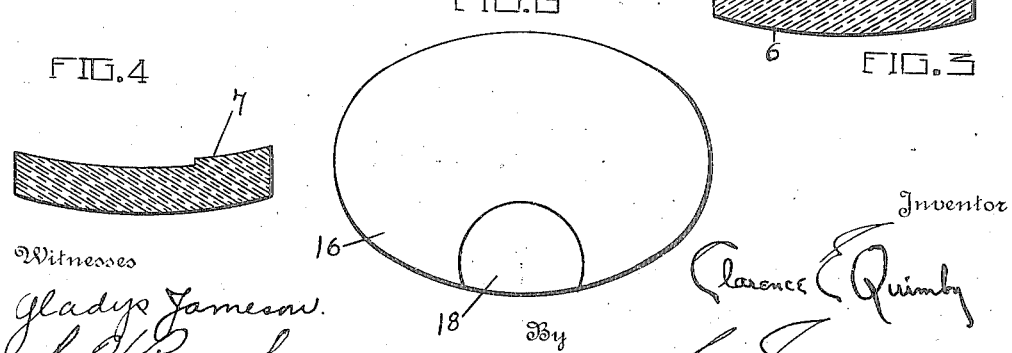
Witnesses
Gladys Jameson.
C. H. Rauch.
Inventor
Clarence E. Quimby
By
Geo F Kirk
Attorney

UNITED STATES PATENT OFFICE.

CLARENCE E. QUIMBY, OF TOLEDO, OHIO, ASSIGNOR, BY MESNE ASSIGNMENTS, TO THE CONTINENTAL LENS CO., OF TOLEDO, OHIO, A CORPORATION OF OHIO.

LENS.

1,303,495.           Specification of Letters Patent.       Patented May 13, 1919.

Application filed October 22, 1914. Serial No. 867,951.

*To all whom it may concern:*

Be it known that I, CLARENCE E. QUIMBY, a citizen of the United States, residing at Toledo, Lucas county, Ohio, have invented new and useful Lenses, of which the following is a specification.

This invention relates to differing contours upon a single face of an article.

This invention has utility when incorporated in connection with a transparent article and its production, as for plural foci lenses, a simple instance of which may be mentioned as a bifocal lens for eyeglass use.

Referring to the drawings:

Figure 1 is a vertical section through a machine embodying the invention with the members in position for the production of one of the curves;

Fig. 2 is a detail of the machine of Fig. 1, with the members in position for the production of a second curve having its medial axis inclined as to the axis of generation of the first curve;

Fig. 3 is a section through a piece of glass to be formed into a bifocal lens blank;

Fig. 4 is a section through the piece of glass after the major curve has been formed thereon, shown herein as a concave face;

Fig. 5 is a section through the piece of glass after the minor curve has been formed thereon upon the same side of the piece of glass as the major curve, but of different extent, the line of demarcation between the two curves being shown as abrupt or providing a ledge, and the glass, accordingly, of different thicknesses where the independent radius curves join; and Fig. 6 is a front elevation of a bifocal lens.

The machine herein may include the vessel 1 for receiving the abrasive supplied between the tool and work. Centrally disposed over this vessel is the rotary member 2 driven by the pulley 3 to rotate the tool 4 for generating in this instance a concave major curve for a bifocal lens blank upon a piece of glass 6 to produce the piece of glass 7. All of the glass need not be surfaced in this operation but only the major curve region whether or not the minor curve may be raised or depressed. Accordingly the central portion of the tool 4 is recessed to provide an inactive portion for the tool face centrally of the tool axis. This work or piece of glass 6 is held in position to oppose the tool 4 by the relatively rotatable work holder member 8.

Centrally of the member 8 is the stud 9 seating in the support 10, for rotation thereon at an angle, herein shown considerably exaggerated, to the axis of rotation of the support 10 as held and driven by the pulley 11. The spring 11' normally throws the pin 12 upward so that it may engage in the recess 13 in the member 8 for one position and in the recess 14 for another definite position. As herein shown, the seat 13 will coact with the pin 12 to hold the support 8 in a concentric position as to the member 2 and the opposing support or member 10. The shifted position for engagement of the pin 12 with the recess 14 is in this instance diametrically disposed as to the recess 13, and with the member 8 in this second position, the minor curve or second face may be produced on the minor area which may be the inner region not ground when the major curve was formed although the order of developing the curves may be reversed. The minor curve has its medial axis in a line intersecting the line of the medial axis of the curve of the other face or major curve, as shown in the bifocal lens blank 15, by the tool 4'.

The lens blank 15, of a single homogeneous transparency, crystal or piece of glass, is shown as having its major curve 16 provided with an axis center 17, the minor curve 18 of greater radius (Fig. 5) than the curve 16 and provided with the axis center 19. The final curve 20 upon the opposite side of the blank may have the center 21, and may be so formed as to the blank to leave the peripheral thickness of the completed lens approach uniformity.

By forming the minor curve or lens portion as herein disclosed, the medial radius line of the minor curve closely approximates the central line of vision in the use of the minor lens portion for short range work and the major portion thereof for long range work. This means that in completing the lens, this central or medial radius line of the minor curve is spaced somewhat from the edge of the minor lens and has thereabout a uniformly effective area of such thickness and so disposed to best assist vision. Accordingly as embodied herein, the minor lens has its optical center approach the center of its extent, thereby producing a minor lens having its general extent effective as a true lens.

In having the tool 4 generate the curve 16 by rotation relatively of the axially alined members 2, 10, the axis of the curve 16, sealed in position on the holder 8, lies in the axis of the member 2, and is indicated in Fig. 5 as the dotted line 22 as distinguished from the dot and dash radius lines.

The angular mounting of the member 8 as to the axis of the members 2, 10, in the diametrical shifting of the member 8 upon the member 10, shifts the work so that the line of the axis of generation of the curve 16 lies outside of and at an angle to the line of the axis of the tool 4', which in its relative rotation as to the work generates the relatively tilted minor curve 18. In Fig. 5, this axis of the minor curve 18 is shown by the dotted line 23. The centers of curvature of the lens faces 16, 18, are independent of each other radially and laterally. The radii shown may be construed as medial axes of the lens curves. The center of the shorter radius curve 16 lies without the radii of the longer radius curve 18. The centers 17, 19, determine a line extra axial to the curves 16, 18, and the curve bounding the face 18 is out of perpendicular to this line. The axis of the curve bounding the face 18 is eccentric to the axis of the major lens. The curved face 16 is a zone section of a sphere eccentric as to the sphere having the zone section forming the curved face 18. The curve bounding the face 18 lies in a plane at an angle to or intersecting the plane of the inter-lens edge of the adjacent curve face 16.

What is claimed and it is desired to secure by Letters Patent is:

1. A lens consisting of a single homogeneous piece of crystal embodying a major lens portion and a minor lens portion, the minor lens portion being tilted to shift its optical center toward the center of the major lens portion, the centers of curvature of said two lens portions being so disposed that in a plane through said curvature centers and the lens a radius from the minor lens center to its lens portion intersects a radius from the major lens portion center to its lens portion, there being a ledge between the minor lens portion and the major lens portion, said ledge defining a curve at the minor lens portion edge, which curve has its axis eccentric to the axis of the major lens portion.

2. A lens consisting of a single homogeneous piece of crystal embodying a major lens portion and a minor lens portion of longer radius than the major lens portion, the minor lens portion being tilted to shift its optical center toward the center of the major lens portion, the centers of curvature of said two lens portions being so disposed that in a plane through said curvature centers and the lens, a radius from the minor lens center to its lens portion intersects a radius from the major lens portion center to its lens portion, there being a ledge between the minor lens portion and the major lens portion, said ledge defining a curve at the minor lens portion edge, which curve has its axis eccentric to the axis of the major lens portion.

In testimony whereof I hereunto set my hand in the presence of two witnesses.

CLARENCE E. QUIMBY.

Witnesses:
C. H. RAUCH,
GEO. E. KIRK.